Figure 1:
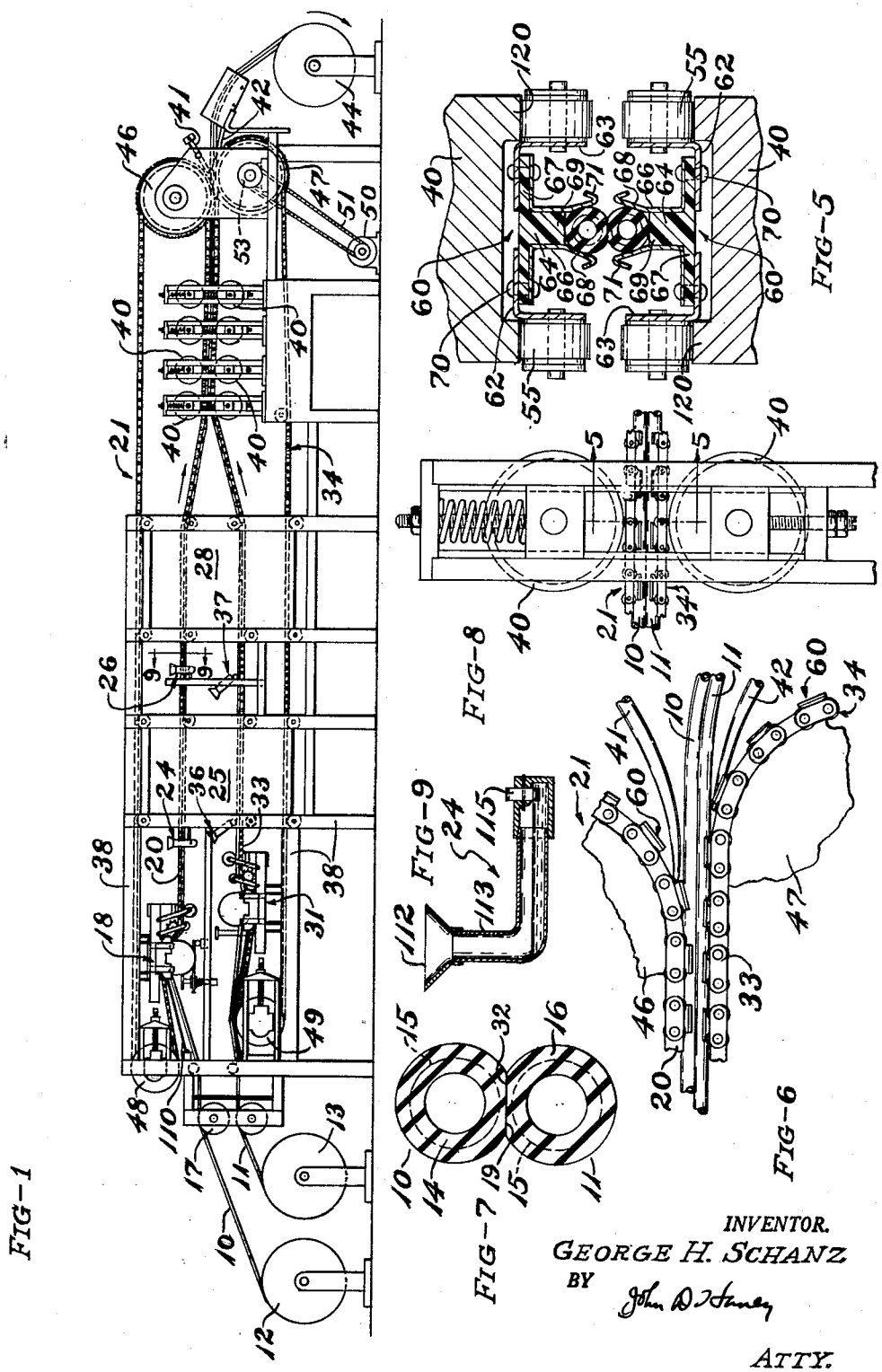

Aug. 7, 1956 G. H. SCHANZ 2,757,710
APPARATUS AND METHOD FOR MAKING MULTIPLE PASSAGE HOSE
Filed April 18, 1955 2 Sheets-Sheet 1

INVENTOR.
GEORGE H. SCHANZ
BY
ATTY.

Aug. 7, 1956     G. H. SCHANZ     2,757,710
APPARATUS AND METHOD FOR MAKING MULTIPLE PASSAGE HOSE
Filed April 18, 1955     2 Sheets-Sheet 2
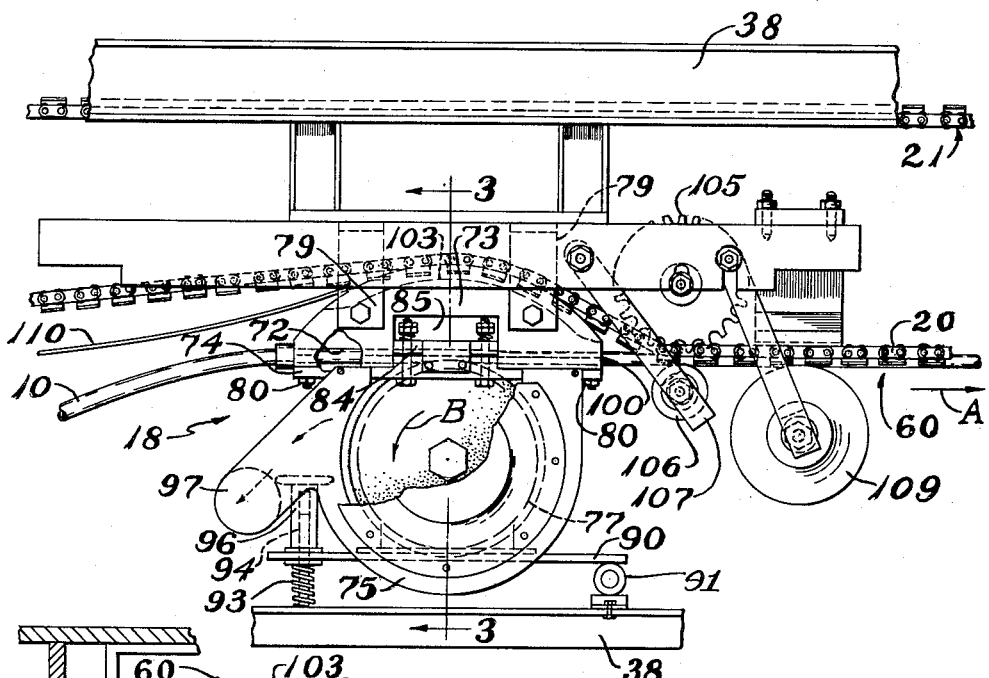
FIG-2
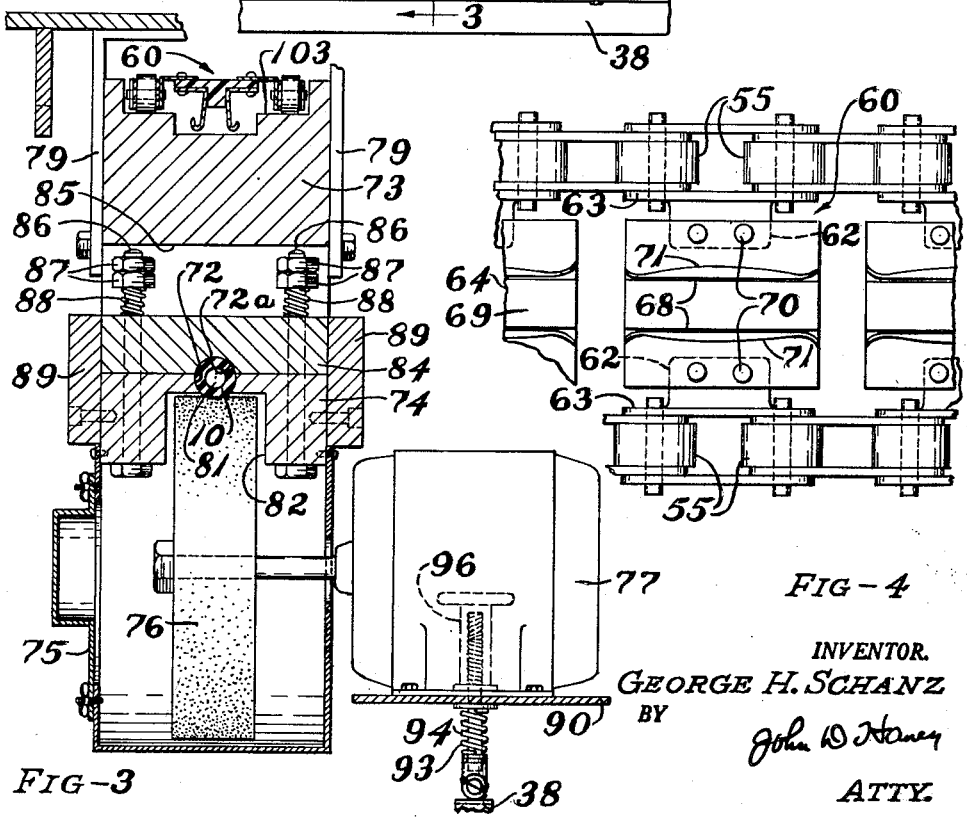
FIG-3
FIG-4
INVENTOR.
GEORGE H. SCHANZ
BY
John D. Haney
ATTY.

United States Patent Office 2,757,710
Patented Aug. 7, 1956

2,757,710

APPARATUS AND METHOD FOR MAKING MULTIPLE PASSAGE HOSE

George H. Schanz, Akron, Ohio, assignor to The B. F. Goodrich Company, New York, N. Y., a corporation of New York Application April 18, 1955, Serial No. 501,938

11 Claims. (Cl. 154—5)

This invention relates to the manufacture of multiple-passage hose and to apparatus for making such hose.

Multiple-passage hose is especially convenient for use in connection with flame cutting, welding, or heating equipment because it does not tend to kink and snarl when reeled or unreeled. The hoses for such equipment are subjected to rough service inasmuch as they are frequently dragged about over abrasive surfaces when in use, and it has been quite difficult to manufacture a satisfactory multiple-passage hose on an economical basis so that the component hoses will not become separated from each other under such conditions.

In accordance with this invention, multiple-passage rubber hose is made by uniting two or more single-passage hoses which have been built and fully vulcanized. In the apparatus the component single passage hoses are moved continuously lengthwise by endless conveyors. The conveyors pull each hose from its supply reel through a grinding mechanism where a portion of the outer cover of the hose is progressively ground away as the hose is advanced through the grinder. Cement is coated on the ground surface by suitable cement dispensers disposed in the path of movement of the hose and drying ovens are provided through which the endless conveyors move each hose to set the cement. The conveyors are arranged to converge upon each other in a region beyond the drying ovens to bring the cemented surfaces of the component hoses into contact with each other and means is provided to press the registering ground surfaces into adhering relation with each other. From the latter means, the finished integral, multiple-passage hose is fed continuously to a wind-up reel for storage or shipment. The cement used to adhere the component hoses is preferably an air-curing cement which cures fully during the storage or period of shipment before the hose is eventually placed in use.

The conveyors each include a series of clips arranged to engage a component hose along a substantial portion of its length so that lengthwise stretching of the hose is minimized as the hose is moved through the various processing stations. The clips resiliently engage the hose and maintain it in a position such that the ground surface registers properly with the corresponding surfaces of the other component hoses when they are pressed together. Equal tension is maintained in the component hoses as they are joined together, and the component hoses are subjected to comparatively little lengthwise stretching both by virtue of the clip structure of the conveyors, and also because the hoses are completely vulcanized prior to being joined together so that they have appreciable stretch resistance. Multiple-passage hose may made in accordance with this invention in which one of the component hoses is of a different size and of a different construction from other component hoses.

The invention will be further described with reference to the accompanying drawings which illustrate a machine constructed in accordance with and embodying this invention.

In the drawings:

Fig. 1 is a side elevation of the apparatus;
Fig. 2 is a side elevation of the upper grinding unit drawn on an enlarged scale;
Fig. 3 is a cross-sectional view taken on the line 3—3 of Fig. 2 showing details of the upper grinding unit;
Fig. 4 is an enlarged plan view showing details of a preferred hose conveyor;
Fig. 5 is an enlarged detailed view taken along the line 5—5 of Fig. 8;
Fig. 6 is a fragmentary side elevation showing the operation of disengaging the hoses from their respective conveyors after they are adhered to each other;
Fig. 7 is an enlarged cross-sectional view showing a finished multiple-passage hose;
Fig. 8 is a side elevation of one of the pressure rolls; and
Fig. 9 is a detail view of the upper cement-applying units (see line 9—9 of Fig. 1).

The apparatus illustrated in the drawings is particularly suited for manufacturing dual passage or "twin" welding hose. It operates to unite to each other a pair of individually constructed hoses 10 and 11 which are fed into the apparatus from supply rolls 12 and 13 respectively at the left end of Fig. 1. Each of these hoses preferably includes an inner tube 14, at least one fabric reinforcement 15, and an outer rubber cover 16 (see Fig. 7) and each hose is preferably fully vulcanized in accordance with conventional hose-building procedure prior to being joined integrally by this apparatus.

The upper hose 10 is trained over an idler roller 17 and then fed through an upper grinding mechanism 18 which grinds a flat surface 19 (see Fig. 7) along the downwardly-directed side of the hose as the hose is fed continuously through the grinder. The hose is pulled through the grinding unit 18 by the lower reach 20 of an endless chain conveyor 21 which engages the hose as fast as it emerges from the grinder and moves it continuously toward the right end of the machine. A short distance beyond the upper grinder 18, a first cement dispenser 24 coats the ground surface of the hose with cement and then the hose is moved by its conveyor through a heating chamber 25 in which the cement is dried. A second coating of cement is next applied to the ground surface by a second cement dispenser 26 and then this additional coating is dried by a second heating chamber 28.

The lower hose 11 is similarly trained over an idler 30 through a lower grinder mechanism 31 which grinds a flat surface 32 (Fig. 7) along the upwardly-directed side of hose. The hose is thereafter engaged by the upper reach 33 of a lower endless chain conveyor 34 as it emerges from the grinder 31. The conveyor 34 moves the hose lengthwise to pull it through the grinder 31 and cement is applied to the ground surface by the lower cement dispensing units 36 and 37. The first cement layer, applied by dispenser 36, is dried in the heating chamber 25 and the second layer of cement is dried in the heating chamber 28 through each of which the reach 33 of the conveyor passes. The grinders 18 and 31 are identical to each other except that the grinding mechanism 31 is supported in an inverted position relative to the grinder 18. The grinding mechanisms, the cement-applying units, the dryers, etc. are all supported on a common frame structure 38.

Upon emerging from the second dryer 28, the hose-carrying reaches 20 and 33 of the two chain conveyors converge on each other and pass through a series of spring-loaded pressure rolls 40 (see Fig. 8 also) where the cemented surfaces of the two hoses are pressed against each other into adhering relation. Thereafter the integrally-joined multiple hose is disengaged from the chain conveyors by plow members 41 and 42 (see Fig. 6) as the hose is delivered to a wind-up reel 44 shown at the extreme right in Fig. 1.

The upper and the lower chain conveyors 21 and 34 are trained around driving sprockets 46 and 47 respectively, at the right end of the machine as it is viewed in Fig. 1, and around tail sprockets 48 and 49, respectively, at the left end of the machine. The driving sprockets 46 and 47 are interconnected by appropriate gearing (not shown) so that the conveyors operate synchronously with each other at equal speed in the directions indicated by the arrows in Fig. 1. The conveyors are driven by a motor 50 through a chain 51 engaged with a sprocket 53 of the lower conveyor.

Each of the conveyors is formed with a pair of mutually parallel, laterally-spaced chains of roller links 55 (see Figs. 4 and 5) which engage the conveyor sprockets 46, 47, 48 and 49. Each of these sprockets has two rows of teeth (not shown) which rows are axially spaced so that the teeth will mesh with each chain of links 55 of each conveyor. The hoses are engaged to their respective conveyors by clip members 60 which are supported from each chain of links 55 and between the chains of links. As shown in Figs. 4 and 5, each clip 60 is suspended between a pair of angle brackets 62, one leg 63 of each of which forms a connecting bar between adjacent links 55 of its respective chain. The clip structure includes a plastic base member 64 of genetrally T cross-sectional shape (see Fig. 5). Thin sheet metal resilient members 66 having a right angle cross-section are riveted to the head portion 67 of the T-shaped base member and include leg portions 68 which extend beyond the body 69 of the base member 64 to resiliently embrace the sides of the hose as shown in Fig. 5. The portion of each of the sheet metal members 66 engaged with the head portions 67 of the base member 64 extends to the extremity of the head and is secured to the head and to the angle brackets 62 by rivets 70. The edges 71 of the leg portions 68 of each clip are preferably curled outwardly from each other, and at the corners of the leg portions, these curled edges 71 are crimped and flared outwardly (see Fig. 4) to add rigidity to the legs and to facilitate the insertion of the hose into the clips.

Since the grinding mechanisms 18 and 31 are identical to each other only the upper grinding mechanism 18 shown in Figs. 2 and 3 will be described. The hose 10 is fed continuously into the grinding unit 18 through a passage defined by registering grooves 72 in a cover member 73 and a base member 74. The base member 74 includes a casing 75 which houses grinding wheel 76 rotatable within the casing by a motor 77. The cover member 73 is supported from the main frame members of the apparatus by hanger straps 79 and the base member is secured to the cover member 73 by bolts 80 (see Fig. 2).

The hose 10 is pulled through the grinder unit 18 by the conveyor 21 as previously noted and, in the course of movement of the hose along the passage formed by the registering grooves 72, the downwardly directed side of the hose is moved tangentially across the peripheral edge of the grinding wheel 76 which grinds the side of the hose to a flat surface. The groove 72 in the base member 74 in the region immediately above the periphery of the grinding wheel 76 has an aperture 81 (Fig. 3) which exposes the lower surface of the hose to the periphery of the grinding wheel. The base member 74 is also slotted at numeral 82 so that the grinding wheel 76 may be positioned with its upper peripheral portion closely adjacent the slot 81.

The hose is urged resiliently against the periphery of the grinding wheel by a plate 84 which is slidably mounted for vertical movement within a transverse slot 85 in the cover member 73 on vertical studs 86. The studs 86 project upwardly from the base member 74 through the corners of plate 84 and include springs 88 to bias the plate toward the base member. The springs 88 are secured about the upper portion of the studs 86 by lock nuts 87. The plate 84 includes a groove 72a through which the hose is moved which groove registers with the groove 72 in the base member and the vertical movement of plate 84 is guided by a pair of side bars 89 which are secured to the base 74. The spring loaded plate 84 maintains a substantially uniform force on the portion of the hose engaged with the grinding wheel so that a flat surface of substantially uniform area and radial depth is ground on the hose throughout the length of the hose. It is of particular importance to avoid grinding through the cover of the hose to the extent that the fabric reinforcement 15 is damaged. The plate 84 serves to regulate the depth to which the cover is ground because if there is a variation in the size of the hose or the like which would materially increase the pressure of the grinding wheel on the hose, the plate 84 may be displaced upwardly by the hose by virtue of its mounting so that the radial depth of the portion of the hose cover ground away remains substantially uniform. By means of the lock nuts 87 the pressure exerted on the hose by the plate 84 may be adjusted to grind the hose to the desired radial depth.

To supplement the action of the movable pressure plate 84, the motor 77 which drives the grinding wheel is resiliently supported adjacent the casing 75 on a thin metal pedestal plate 90. One end of plate 90 is secured rigidly to a tube 91 rigidly fastened to the main frame members 38 which serves as a fulcrum for the plate 90. The motor 77 is secured at about the center of the plate and the opposite end of the plate is supported for movement relative to the fulcrum tube 91 by a compression spring 93 surrounding a stud 94 (see Figs. 2 and 3) projecting upwardly from a main frame member 38 and through the plate 90. The plate is maintained in pressure engagement with the spring by an adjustable cap 96 which is threaded onto the upper end of stud 94. By adjusting the cap 96 the flexibility of the plate 90 may be accurately regulated and therefore the pressure engagement of the grinding wheel against the hose may be adjusted. The principal function of this resilient mounting for the motor 77 and grinding wheel is to absorb vibrations caused by the rotation of the motor and thereby eliminating chatter marks or the like on the ground face of the hose. The grinding wheel may be displaced downwardly however against the resistance of spring 93 if there is a substantially irregularity in the hose.

The grinding wheel 76 is rotated in a direction such that at the point of contact with the hose, the wheel moves counter to the direction of lengthwise movement of the hose. As indicated in Fig. 2, the hose is moved rightward in the direction of arrow A and the grinding wheel is rotated counterclockwise in direction of arrow B. With this rotation the particles ground from the hose are thrown backwardly toward the unground portion of the hose approaching the grinding wheel and the ground surface of the hose is kept clean. Preferably the casing 75 includes a dust collector connection 97 (Fig. 2) which removes the ground particles from the surface of the wheel. Preferably the surface speed of the grinder is comparatively high to provide a clean smooth ground surface along the hose.

As the hose passes out of contact with the grinding wheel 76, it moves through the passage defined by the grooves 72 and emerges from the grinding unit at numeral 100 where it is engaged with the clips 60 of the upper conveyor 21. It may be noted in Figs. 2 and 3 that the lower reach of conveyor 21 moves forwardly from its tail sprocket 48 over the upper surface of the cover member 73. The upper surface of cover member 73 includes a groove 103 through which the clips of the conveyor pass in the course of movement across the cover member. The lower reach of conveyor 21 is deflected downwardly by a sprocket 105 and the hose as it progressively emerges from the grinder 18 is fed over an idler roller 106 which is positioned rigidly by supporting members 107 so that the roller 106 presses the hose progressively into the successive clips 60 of the conveyor with its ground surface directed downwardly. An additional idler roller 109 is provided to insure that the hose is firmly seated in the clips as it is carried forwardly by the conveyor.

The hose 11 is ground in essentially the same manner as hose 10 except that the grinding unit is inverted; hence the hose 11 emerges from its respective grinder with its ground surface directed upwardly and is pressed downwardly into engagement with the clips of the lower conveyor 34.

Both the upper grinder 18 and the lower grinder 31 are provided with a thin plate 110 secured to the frame members 38 intermediate the hose and its respective chain conveyor (see Fig. 2). This plate shields the conveyor as the hose enters the grinder so that the hose can not be entangled with the conveyor.

Each of the cement-applying units 24, 26, 36 and 37 is preferably a commercially available "stripping unit" and includes a funnel 112 (Fig. 9) having a tube 113 leading therefrom with a roller 115 at the bottom of the tube which rolls along the ground surface of the hose and deposits a coating of liquid cement thereon a supply of which is maintained in the tube 113. The unit 24 shown in Fig. 9 includes a bend in the tube 113 so that the roller 115 cements the hose 10 as it moves above the roller. The unit 26 is identical with the unit 24. The cementing units 36 and 37 associated with the lower conveyor 34 are substantially identical to unit 24 except that the respective supply tubes 113 of these units does not include a bend so that the rollers 115 apply cement to the hose 11 at it moves below the rollers 115.

The heating or drying units 25 and 28 may be resistance or steam heaters. The temperature of the heaters will, of course, depend on the nature of the cement and the speed at which the hoses are moved through the heaters. A preferred cement which is air-curing and which attains its maximum bonding strength about ten or twelve days after the multiple-passage hose is formed is a neoprene-type cement. Using this type cement, the heaters are maintained at preferably about 300° and the hoses are moved through the heaters at about 8 feet per minute.

From the second drying unit the upper and lower conveyors converge toward each other and are trained between the four sets of spring-loaded rolls 40 (see Figs. 5 and 8). Each of the pressure rolls has a pair of radial edge flanges 120 at its periphery upon which the rollers of the links and its respective conveyor are engaged as shown in Fig. 5. The spacing between the rolls is regulated so that the cemented surfaces of the hoses 10 and 11 are pressed together as the conveyors move between the rolls.

As the hoses are moved beyond the group of pressure rolls 40 they are adhered together along their ground surfaces. The conveyors advance toward their respective drive sprockets 46, 47 and as the conveyors diverge from each other around their respective drive sprockets, the clips of each conveyor are progressively disengaged from the united hoses by plows 41 and 42 consisting of curved pieces of metal or the like and are secured to the frame in a position shown in Fig. 6 to prevent the hoses from climbing with the conveyors around the sprockets.

Preferably the grinding mechanisms grind a flat surface of uniform area along each side of the hoses which area in width is about half the outer diameter of the hose so that there is a substantial area of adhesion between the two component hoses. If the hoses are reinforced with the fabric, preferably the fabric is located comparatively close to the inner tube 14 of the hoses so that in the grinding operation the reinforcing fabric is not exposed or damaged. The width of ground mating areas of each hose should be at least greater than ⅓ of the outer diameter of the hose, and may be more than half the outer diameter but preferably the radial depth of the ground surface should not exceed about half the thickness of the rubber cover.

Variations in the structure and procedure previously described may be made within the scope of the appended claims.

I claim:

1. Apparatus for manufacturing multiple-passage hose, the apparatus comprising means for grinding a continuous surface along one side of each of a pair of fully vulcanized flexible hoses of rubber-like material, means for engaging the hoses and advancing the hoses relative to the grinding means, means for progressively applying cement to said surface of each hose, means for progressively drying said cement, means for progressively guiding said hoses into juxtaposed relation to each other with said cemented surfaces registering with each other, means for pressing said surfaces into mutual adhering relation, and means for progressively reeling said adhered hoses for storage.

2. Apparatus for manufacturing multiple-passage hose, the apparatus comprising a frame structure, a pair of endless hose conveyors mounted upon said frame structures each having a load-carrying reach disposed adjacent the corresponding reach of the other conveyor and the load-carrying reaches being movable in the same direction relative to the frame structure and at equal speeds, each conveyor including means for engaging its respective hose at closely-spaced intervals along the length of the hose, means for progressively grinding a continuous surface of uniform area along each said hose at it is advanced endwise by said conveyors, means for applying cement to said surfaces of said hoses, a dryer disposed in the path of said conveyors for drying said cement, pressure rolls for converging said reaches of the conveyors to press said cemented surfaces of the hoses into adhering relation with each other, and means for progressively reeling said hoses as they are adhered to each other.

3. Apparatus for manufacturing multiple-passage hose, the apparatus comprising a frame structure, a pair of endless hose conveyors mounted upon said frame structure, each having a load-carrying reach disposed adjacent the corresponding reach of the other conveyor, and the load-carrying reaches being movable in the same direction relative to the frame structure and at equal speeds, each conveyor comprising a pair of chains of flexible members in laterally-spaced relation, the chains being interconnected transversely by a series of clip members disposed intermediate said chains of flexible members, each of the clip members comprising a pair of resilient leg members to embrace the sides of a hose along a substantial length of the hose, and the clips being closely spaced one from another lengthwise of the hose to minimum lengthwise stretching of the hose, means for progressively grinding a continuous surface of uniform area along each said hose as the hose is advanced lengthwise by said conveyors, means for applying cement to said surfaces of said hoses, means for pressing said cemented surfaces into adhering relation to each other, and means for progressively reeling said hoses as they are adhered to each other.

4. Apparatus for manufacturing multiple-passage hose, the apparatus comprising a frame structure; endless hose conveyors mounted upon said frame structure for receiving and advancing component single passage hoses lengthwise; grinder mechanism for progressively grinding a continuous surface along one side of the hoses as they are advanced lengthwise by the conveyors, the grinder mechanism comprising a cover member, a casing member connected to the cover member, means for securing said members to the frame, a passage through the casing member through which a hose is advanced lengthwise, an abrasive member within said casing, an aperture in said passage exposing a portion of said hose therein to said abrasive member, means in said cover member for urging said hose resiliently against said abrasive member, and means for driving said abrasive member; means for progressively engaging said hoses with said conveyors as the hoses emerge from said grinder mechanism; means for applying cement to said ground surfaces of said hoses; and means for progressively guiding said reaches of the conveyors to bring said cemented surfaces into pressure contact to adhere said surfaces to each other.

5. Apparatus for manufacturing multiple-passage hose, the apparatus comprising a frame structure, a pair of endless conveyors trained lengthwise of the frame structure each having a load-carrying reach disposed adjacent the corresponding reach of the other conveyor, and the load-carrying reaches being movable in the same direction relative to the frame structure and at equal speeds, each conveyor comprising a pair of chains of roller links in laterally-spaced relation which chains are transversely interconnected by a series of clip members intermediate the chains each for resiliently engaging the hose along a substantial portion of its length, a grinder mechanism associated with each conveyor for grinding a continuous surface of uniform area along each said hose as the hose is advanced lengthwise by said conveyors, means for resiliently urging said hoses in contact with their respective grinders during said grinding, means for applying cement to said ground surfaces of said hoses, a pair of pressure rolls for pressing said cemented surfaces of the hose into mutually adhering relation, said rolls being supported on parallel axes with each of said conveyors trained between the rolls, and each roll including a pair of peripheral flanges to support said chains of roller links of each conveyor with said cemented surfaces of the hoses registering with each other, means for pressing said rolls toward each other to press said cemented hose surfaces into adhering relation with each other, and means for progressively disengaging said adhered hoses from their respective conveyors as the hoses are moved beyond said pressure rolls.

6. Apparatus for manufacturing multiple-passage hose, the apparatus means for advancing lengthwise each of a pair of fully vulcanized flexible hoses of rubber-like material, an abrading mechanism in the path of said hoses for abrading a surface along one side of each of said hoses, means for resiliently urging said hoses against said abrading mechanism, means for applying cement to said abraded surfaces of said hoses, and means for progressively guiding said hoses into juxtaposed relation to bring said cemented surfaces into registering adhering relation with each other.

7. Apparatus for manufacturing multiple-passage hose, the apparatus comprising a conveyor for advancing lengthwise each of a pair of fully vulcanized flexible hoses of rubber-like material, said conveyor including a series of clip members for resiliently engaging the hose, the clips being closely spaced one from another lengthwise of the hose to minimize lengthwise stretching of the hose, means for progressively abrading a surface along one side of each hose as the hose is advanced lengthwise, means for applying cement to said abraded surfaces, and means for guiding said hoses into juxtaposed relation to bring said cemented surfaces into registering adhering relation with each other.

8. A continuous method of manufacturing multiple passage hose which comprises providing two vulcanized hoses each having an external cover of rubber-like material, progressively advancing said hoses lengthwise, progressively abrading a surface along one side of the cover of said hoses, progressively applying cement to said abraded surfaces, and progressively guiding said hoses into juxtaposed relation to bring said cemented surfaces into registering adhering relation with each other.

9. The method of manufacturing multiple passage hose which comprises providing two vulcanized hoses each having an external cover of rubber-like material, progressively advancing said hoses lengthwise, progressively abrading a surface along one side of the cover of said hoses, progressively applying vulcanizing cement to said abraded surfaces, and progressively guiding said hoses into juxtaposed relation to bring said cemented surfaces into registering adhering relation with each other.

10. The method of manufacturing multiple passage hose which comprises providing two vulcanized hoses each having an external cover of rubber-like material, progressively advancing said hoses lengthwise, progressively abrading a surface along one side of the cover, progressively applying air-curing cement to said abraded surfaces, progressively guiding said hoses into juxtaposed relation to each other with said cemented surfaces registering with each other, and thereafter reeling the hoses so that the cement cures after the hoses are reeled.

11. The method of manufacturing multiple passage hose which comprises providing two vulcanized hoses each having an external cover of rubber-like material, continuously feeding each said hose lengthwise, progressively grinding a mating face along one side of each said hose, progressively applying air-curing cement to the mating surfaces of each hose as said surfaces are ground, progressively drying said cement, progressively pressing the mating surfaces together into adhered relation, and thereafter reeling the resulting adhered hoses so that the cement cures completely along the mated surfaces after the hoses are reeled.

References Cited in the file of this patent
UNITED STATES PATENTS

| | | |
|---|---|---|
| 2,351,111 | Davis | June 13, 1944 |
| 2,621,075 | Sedar | Dec. 9, 1952 |